L. M. JONES.
HAY LOADER.
APPLICATION FILED OCT. 3, 1916.
1,262,674.
Patented Apr. 16, 1918.
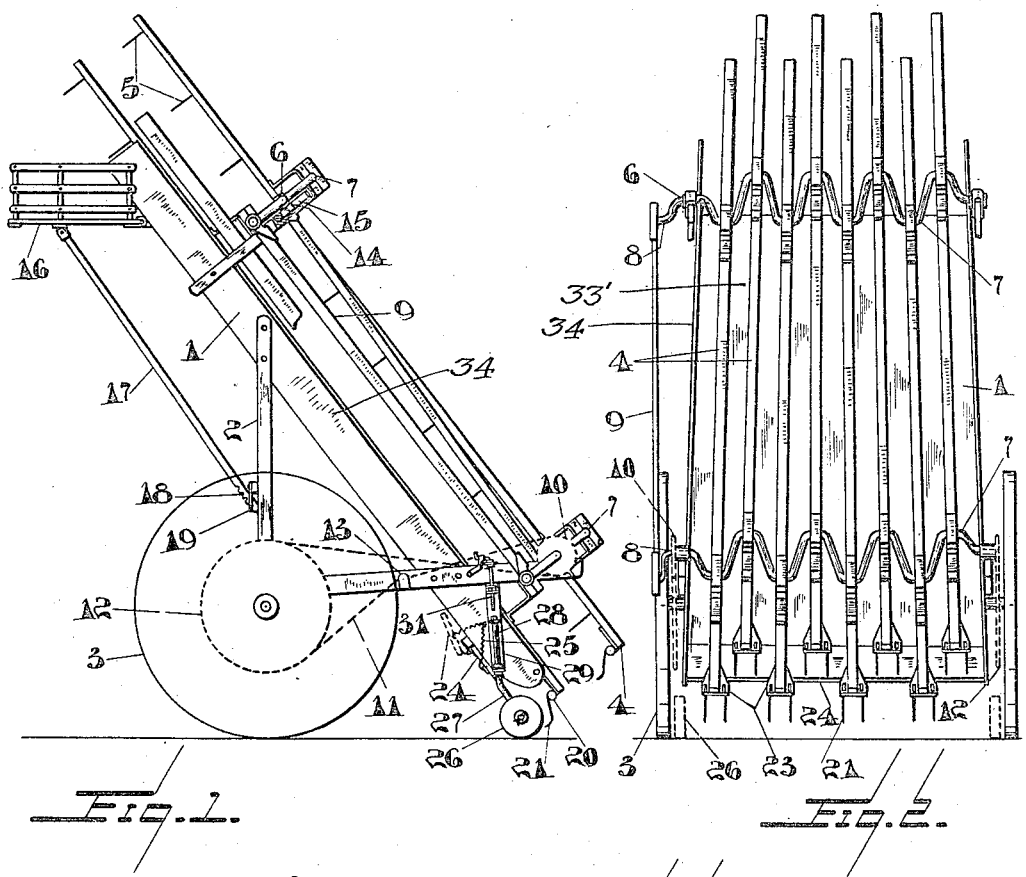
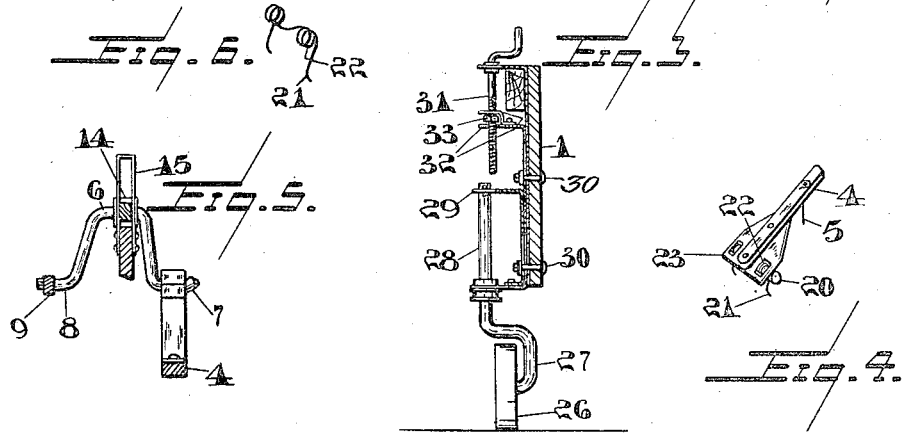
WITNESSES.
N. R. Tyndall
L. M. Lewis
INVENTOR.
L. M. Jones.
BY J. Edward Maybee
ATTY.

UNITED STATES PATENT OFFICE.

LYMAN MELVIN JONES, OF TORONTO, ONTARIO, CANADA, ASSIGNOR TO MASSEY-HARRIS COMPANY, LIMITED, OF TORONTO, ONTARIO, CANADA.

HAY-LOADER.

1,262,674.   Specification of Letters Patent.   Patented Apr. 16, 1918.

Application filed October 3, 1916.   Serial No. 123,540.

*To all whom it may concern:*

Be it known that I, LYMAN MELVIN JONES, a subject of the King of Great Britain, residing in the city of Toronto, county of York, Province of Ontario, Canada, have invented certain new and useful Improvements in Hay-Loaders, of which the following is a specification.

This invention relates to hay loaders of the type in which a plurality of kicker or bumper bars are adapted to operate alternately to raise the hay up the inclined elevator chute, and my object is to improve the construction of a loader of this type to facilitate the raising of the hay from the ground under various crop conditions and to satisfactorily prevent the entanglement of hay in the teeth of the kicker bars nearest to the ground.

I attain my object by means of the constructions hereinafter described and illustrated in the accompanying drawings in which—

Figure 1 is a side elevation of a loader constructed in accordance with my invention;

Fig. 2 a front elevation of the same;

Fig. 3 a detail of the adjusting means for the swivel wheels;

Fig. 4 a perspective detail of the guard for the lower kicker bar teeth;

Fig. 5 a detail of one of the upper crank shaft bearings, and

Fig. 6 is a perspective detail of one of the pairs of kicker teeth at the lower ends of the kicker bars.

In the drawings like numerals of reference indicate corresponding parts in the different figures.

The elevator chute 1 is of ordinary construction, being provided with a bottom 33′, and sides 34, the latter tapering inwardly from the bottom toward the top. The chute is supported by a frame work 2, which in turn is supported by the main ground wheels 3.

The elevating mechanism comprises a plurality of kicker or bumper bars 4 provided with rake teeth 5. These bars are actuated by means of two crank shafts 6, suitably journaled on the chute, provided with cranks 7 extending alternately in opposite directions and journaled on the kicker bars. The kicker bars thus form two series which alternately operate on the hay passing up the chute, as the crank shaft is rotated.

The crank shafts are also provided with end cranks 8 connected by a pitman 9 so that the crank shafts may be simultaneously actuated. I deem it preferable to reduce the spacing between the cranks of the upper crank shaft as compared with the cranks of the lower crank shaft to suit the kicker bars to the taper of the chute. I find superior results may thus be obtained.

The lower crank shaft is driven by means of the sprocket wheels 10 engaged by the sprocket chains 11 driven by the sprocket wheels 12 connected with the ground wheels. An idler 13 is pivoted on the frame for each sprocket chain 11. These idlers support the lower part of the sprocket chains passing from the wheels 12, and, the chains being crossed, holds the parts of the chain from interfering with one another.

The lower crank shaft 6 is journaled in fixed bearings, but the upper crank shaft is carried in bearings 14 slidable to and from the bottom of the chute in suitable guides 15. With this arrangement the kicker bars may lift away from the bottom of the chute to prevent choking when the machine is working on a very heavy crop. The contraction of the sides of the chute bunches the hay so that it is more readily acted on by the teeth of the kicker bars but this has some tendency to choke the loader adjacent the top which tendency is overcome by the "floating" of the upper crank shaft as described.

A hinged extension 16 is provided at the upper end of the chute. The kicker bars extending beyond the end of the main portion of the chute, this hinged extension may be positioned to properly discharge the hay by means of a bar 17 pivotally connected with the under side of the extension provided with notches 18 at its lower end whereby it may be engaged with a suitable part 19 of the frame in any one of several positions.

The lower end of each kicker bar is provided with a short transverse bar 20 for the connection of two spring teeth 21. These teeth are preferably integral with one another (see Fig. 6) each formed with a coil 22 surrounding the transverse bar, the ends of the coils being inserted in or otherwise secured to the bar. These spring teeth are curved and are longer than the teeth 5, and are intended to start the hay on its upward course along the chute 1. The coils on the transverse bar are, however, particularly liable to catch wisps of hay, and I therefore provide the guard plates 23. These are approximately triangular in form and are secured between the kicker bars and the transverse bars, being in width substantially equal to the length of the transverse bars.

To permit of the free action of the coils 22 an opening is cut on each side of each guard plate into which the upper parts of the coils may project. These guard plates effectively prevent hay catching in the spring coils or in the angles between the kicker bars and the transverse bars, and also brace the transverse bars to the kicker bars.

I have found that different crop conditions require that the lower ends of the kicker bars and of the chute shall be set at different distances from the ground, and to provide for this the following constructions have been devised and combined.

The lower end of the bottom of the chute is formed by a hinged board 24. This hinged board may be swung down to the position shown in full lines in Figs. 1 and 2, or may be swung up to the position shown in dotted lines in Fig. 1. A coil spring 25 is provided at each side connected with the frame in such a position that it tends to yieldingly hold the hinged board 24 in either position. With a very heavy crop the board will probably require to be swung up to the dotted position. For light and normal crops it will require to be set in the position shown in full lines. Owing to its being spring held, it will, however, yield to provide room for the raising of any special large accumulation of hay which the loader may meet with.

The distance of the lower ends of the kicker bars from the ground is regulated by providing the swivel wheels 26 with means of adjustment on the frame. Each swivel wheel is journaled on the lower end of an axle 27, which is bent upwardly to form a journal 28 journaled in a bracket 29. This bracket is slotted to slide on bolts 30 secured to the frame. The bracket is vertically adjustable by means of a screw 31 secured to the frame and extending through jaws 32 formed on or secured to the bracket 29. Between these jaws a nut 33 is threaded on the screw. It is evident that by rotating the nut, the bracket 29 may be raised or lowered as desired. By suitably adjusting the position of the swivel wheels relative to the frame, the position of the lower ends of the chute and the kicker bars may be adjusted as desired, and further adjustment to different crop conditions may be provided by suitably positioning the hinged board 24.

What I claim as my invention is:—

1. In a hay loader, the combination of an elevator chute provided with a bottom and sides; a transverse throat board hinged at the lower end of the bottom so that it may be swung up and down; spring means tending to maintain said board in normal position; a plurality of crank operated kicker bars adapted to raise hay or the like up said chute; a pair of swivel wheels for the lower end of the frame; and means for vertically adjusting the swivel wheels.

2. In a hay loader, the combination of an elevator chute provided with a bottom and sides and tapering inwardly from the bottom toward the top; a transverse throat board hinged at the lower end of the bottom so that it may be swung up and down; spring means tending to maintain said board in normal position; rotary crank shafts journaled transversely of the chute provided with cranks extending alternately in opposite directions; a plurality of kicker bars journaled on said cranks, the upper crank shaft being arranged to "float;" a pair of swivel wheels for the lower end of the frame; and means for vertically adjusting the swivel wheels.

3. In a hay loader, a kicker bar having a short transverse bar secured to its lower end; kicker teeth secured to the transverse bar, one at each side of the kicker bar, and each formed with a coil surrounding the bar; and a guard plate secured to the underside of the kicker bar and substantially covering said transverse bar and tapered at its upper end, and cut out at each side to give play to the spring coils of the kicker teeth, and to brace the transverse bar.

4. In a hay loader, a kicker bar having a short transverse bar secured to its lower end; integral kicker teeth secured to the transverse bar, one at each side of the kicker bar, and each formed with a coil surrounding the bar, the coils being integrally connected by a loop; and a guard plate secured to the underside of the kicker bar and substantially covering said transverse bar and tapered at its upper end, and cut out at each side to give play to the spring coils of the kicker teeth, and to brace the transverse bar.

Signed at Toronto this 26th day of September, A. D. 1916.

LYMAN MELVIN JONES.

Witnesses:
ALFRED SPAULDING PATTERSON,
JOHN G. HOSSACK.